US008464179B2

(12) United States Patent
de Brebisson (10) Patent No.: US 8,464,179 B2
(45) Date of Patent: Jun. 11, 2013

(54) MATH MENU USER INTERFACE ON A CALCULATOR

(75) Inventor: Cyrille de Brebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 12/243,806

(22) Filed: Oct. 1, 2008

(65) Prior Publication Data

US 2010/0031172 A1 Feb. 4, 2010

Related U.S. Application Data

(60) Provisional application No. 61/084,885, filed on Jul. 30, 2008.

(51) Int. Cl.
*G06F 3/048* (2006.01)
(52) U.S. Cl.
USPC .......................................... 715/810; 708/131
(58) Field of Classification Search
USPC ........................................ 715/764, 828–829
See application file for complete search history.

(56) References Cited

U.S. PATENT DOCUMENTS

| | | | | |
|---|---|---|---|---|
| 4,385,366 A * | 5/1983 | Housey, Jr. | .................. | 345/170 |
| 4,580,235 A * | 4/1986 | Yanagawa | ..................... | 708/135 |
| 5,020,012 A * | 5/1991 | Stockberger et al. | ......... | 708/144 |
| 5,377,130 A * | 12/1994 | Frank et al. | .................... | 708/142 |
| 5,532,946 A * | 7/1996 | Phipps et al. | ................. | 708/174 |
| 5,594,673 A * | 1/1997 | Coffin | .......................... | 708/145 |
| 5,821,936 A * | 10/1998 | Shaffer et al. | ................. | 715/810 |
| 6,243,726 B1 * | 6/2001 | Satoh | ............................ | 715/205 |
| 6,282,699 B1 * | 8/2001 | Zhang et al. | .................... | 717/109 |
| 6,557,018 B1 * | 4/2003 | Shibasaki | ..................... | 708/131 |
| 6,874,005 B2 * | 3/2005 | Fortenberry et al. | ......... | 708/130 |
| 7,194,699 B2 * | 3/2007 | Thomson et al. | ............. | 715/823 |
| 7,403,189 B2 * | 7/2008 | Brebisson | ..................... | 345/169 |
| 7,810,044 B2 * | 10/2010 | de Brebisson et al. | ....... | 715/788 |
| 7,827,221 B2 * | 11/2010 | Katayama | ..................... | 708/137 |
| 7,831,785 B2 * | 11/2010 | de Brebisson et al. | ....... | 711/159 |
| 7,856,603 B2 * | 12/2010 | Molgaard | ..................... | 715/835 |
| 2004/0181563 A1 * | 9/2004 | Chuang et al. | ................ | 708/160 |
| 2005/0030290 A1 | 2/2005 | de Brebisson | | |
| 2005/0033783 A1 | 2/2005 | de Brebisson | | |
| 2005/0033784 A1 | 2/2005 | de Brebisson | | |
| 2005/0041017 A1 | 2/2005 | de Brebisson | | |
| 2006/0075008 A1 | 4/2006 | Lapeira et al. | | |
| 2008/0244403 A1 * | 10/2008 | Kaneko | ......................... | 715/711 |
| 2009/0007012 A1 * | 1/2009 | Mandic et al. | ................ | 715/810 |
| 2009/0024934 A1 * | 1/2009 | Dunk et al. | .................... | 715/753 |
| 2010/0031172 A1 * | 2/2010 | de Brebisson | ................ | 715/764 |

OTHER PUBLICATIONS

Wolfram Mathematica 6, Jul. 11, 2007, release notes http://web.archive.org/web/20080315220806/reference.wolfram.com/mathematica/ref/PopupMenu.html.*

(Continued)

*Primary Examiner* — Michael Roswell
*Assistant Examiner* — William Titcomb (57) ABSTRACT

A system comprises a processor and a keyboard coupled to the processor. The keyboard comprises a mathematical function key and an arrow key. When the mathematical function key is pressed, the processor causes the display to display a sequence of math functions or math menu choices upon a user repeatedly pressing the arrow key. For each math function displayed on the display, the processor concurrently also causes the result of the math function to be displayed without the user pressing another key.

14 Claims, 5 Drawing Sheets

OTHER PUBLICATIONS

TI-83Plus/ TI-83Plus Silver Edition, published Jul. 23, 2003, http://education.ti.com/guidebooks/graphing/83p/83m$book-eng.pdf.*
Casio image file, found within the Manual.*
Casio fxl 15ms Manual link http://support.casio.com/manualfile.php?rgn=5&cid=004001005 (provided in .pdf format) The pdf reference is provided without a publication or release date—but is used in combination with the CNET review, to establish a date of at least as late as Feb. 21, 2006.*
Casio fx115ms CNET market place advertisement, with release date Feb. 21, 2006.*

* cited by examiner

| Abs<br>30.00 | LOG<br>1.48 |
|---|---|
| FIG. 3e | FIG. 3f |

| 05 | Trigonometry | π<br>3.14 | SIN⁻¹<br>30.00 |
|---|---|---|---|
| FIG. 5a | FIG. 5b | FIG. 5c | FIG. 5d |

| COS⁻¹<br>60.00 | TAN⁻¹<br>26.57 |
|---|---|
| FIG. 5e | FIG. 5f |

MATH MENU USER INTERFACE ON A CALCULATOR

CROSS REFERENCE TO RELATED APPLICATIONS

This application claims the benefit of provisional application Ser. No. 61/084,885, filed Jul. 30, 2008, titled "Math Menu User Interface On A Calculator."

BACKGROUND

Modern calculators are capable of numerous mathematical functions. Many calculators are hand-held and thus have limited space for a display and keyboard. A design tension thus exists between increasing the functionality of a calculator and the limited space for buttons on the keyboard and the display. Some calculators have multiple functions assigned to each button. However, multiple function assignments to a single button can be burdensome on the user of the calculator. At any rate, even with multiple function assignments for each button, there still might not be enough button space for all of the functions desired.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
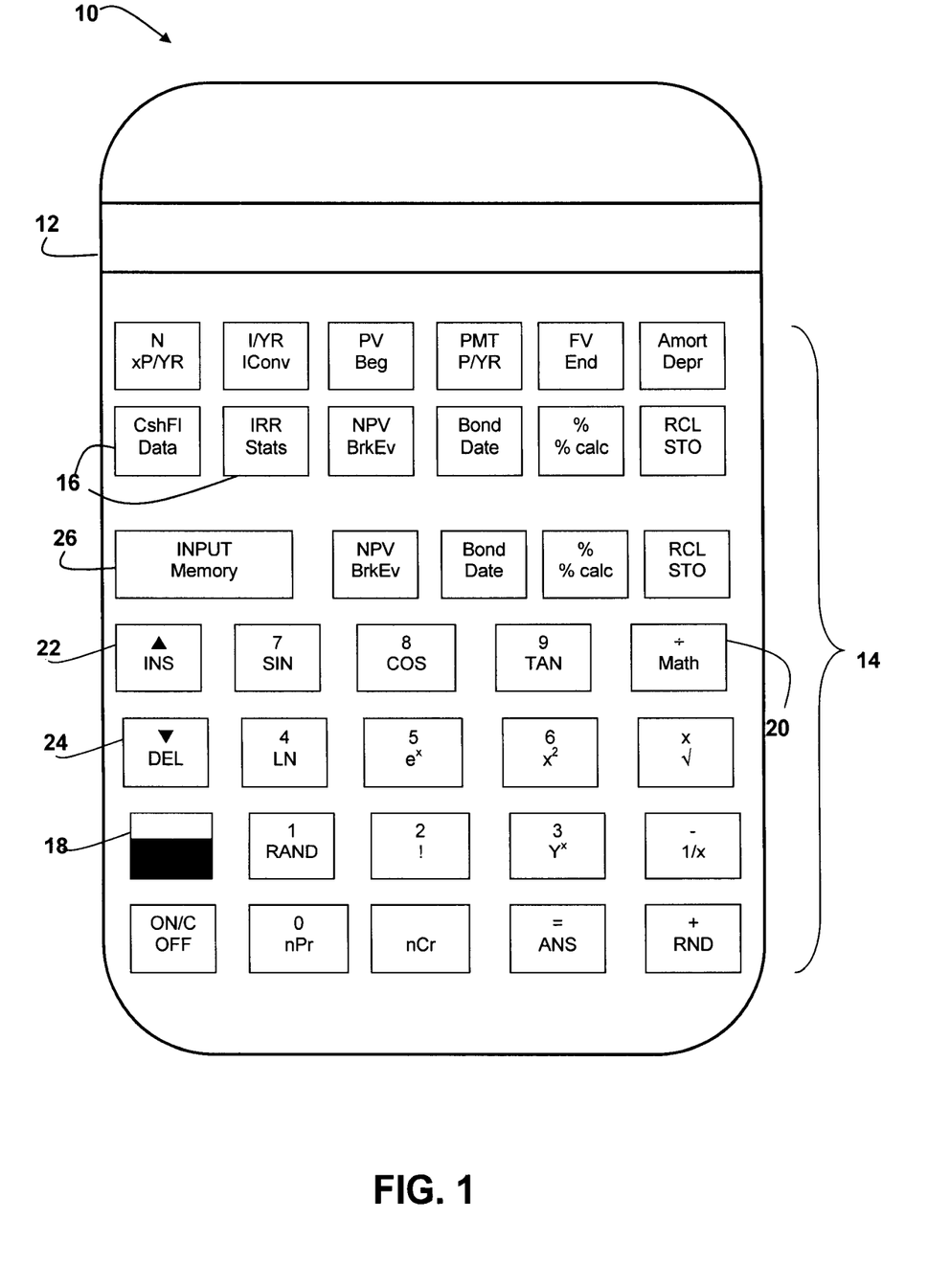
FIG. 1 shows a calculator in accordance with embodiments of the invention.

FIG. 1 shows an embodiment of an electronic computing system 10. In the embodiment shown, the electronic computing system 10 is a hand-held, battery-operated calculator and is referred to as a calculator in this disclosure. The calculator 10 comprises a display 12 and keyboard 14. In some embodiments, the display 10 is a 1 or 1.5 line display. A 1.5 line display means that one line is used for numbers as well as text and a second line is used for numbers only. The keyboard 14 includes multiple buttons 16, many of which have more than one function assigned thereto. Of the keyboard's buttons 16, the following buttons are discussed herein: shift button 18, math button 20 (also includes the division function), up arrow button 22, down arrow button 24, and input button 26. The up and down arrow buttons 22, 24 comprise direction keys that permit a user to navigate up and down through a set of choices presented on the display 12. The terms "button" and "key" are used synonymously in this disclosure.

The shift button 18 is pressed to select the lower-most function of any of the buttons 16. If the math function is selected on the math button 20, the shift button 18 is pressed first followed by math button 20. If the shift button 18 is not pressed, then pressing the math button 20 simply selects the division function.

Figure 2:
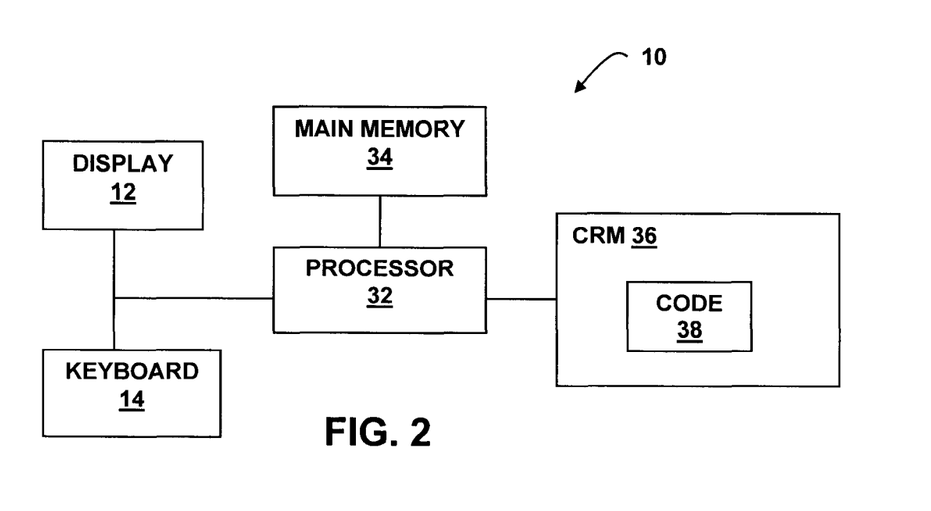
FIG. 2 shows a system block diagram of the calculator of FIG. 1.

FIG. 2 illustrates an electrical block diagram of the calculator 10. As shown, the calculator 10 comprises a processor 32 coupled to the display 12 and keyboard 14, as well as to main memory 34 and a computer-readable memory (CRM) 36. Code 38 is stored on the CRM 36 and is executed by processor 32. Some or all of the functionality described herein is implemented in code 38. The CRM 36 comprises volatile memory (e.g., random access memory), non-volatile storage (read-only memory (ROM)), hard disk drive, Flash memory, etc.), or combinations thereof.

The shift button 18, math button 20, up and down arrow buttons 22, 24, and input button 26 enable a user to select from serially-displayed list of math functions or math menu choices. A math function is one that receives input data and performs a mathematical operation on the input data to produce a result. Examples include sine, cosine, inverse sine, inverse cosine, hyperbolic sine, hyperbolic cosine, and chi-squared. A math menu choice is an alphanumeric heading that broadly describes a group of one or more math functions or sub-menu choices, and is not itself a math function. For example, sine and cosine are trigonometric functions and thus embodiments of the calculator provide for a menu choice called "trigonometry" to be shown on display 12. The trigonometry menu choice can be selected to then permit a user to select one of the trigonometry math functions associated therewith. Examples of other math menu choices include a hyperbolic menu choice and a probability math menu choice.

The process of select from serially-displaying a list of math functions or math menu choices is illustrated in FIGS. 3a-3f.

Figure 3A:
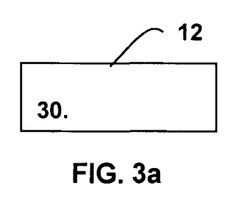
FIGS. 3a-3f illustrate a sequence of events using a math button on the calculator to sequence through a series of menu choices and math functions in accordance with various embodiments.
Figure 3B:
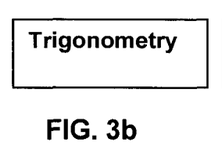
Figure 3C:
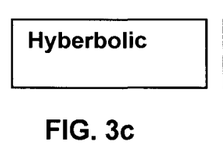
Figure 3D:
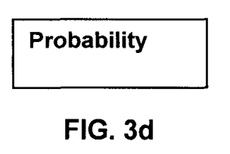

In FIG. 3a, a user enters a data value using the keyboard 14. In this example, the user has entered the number '30' which is shown on display 12. In FIG. 3b, the user has pressed the shift button 18, then the math button 20. Pressing the math button 20 causes a menu choice to be shown on the display 12. The menu choice shown in FIG. 3b is the "Trigonometry" menu choice. If the user desires to perform a trigonometric function (e.g., inverse sine, inverse cosine, inverse tangent), the user presses the input button (a process described below with regard to FIGS. 5a-4h). However, if the user does not desire to perform a trigonometric function, the user can press the down arrow key 24 to cause the next menu choice to be displayed— "Hyperbolic" menu choice in the example of FIG. 3c. Subsequently pressing the input button 26 permits the user to choose a hyperbolic function (e.g., hyperbolic sine, hyperbolic cosine, hyperbolic tangent). However, if the user does not desire to perform a hyperbolic function, the user can press the down arrow key 24 to cause the next menu choice to be displayed—"Probability" menu choice in the example of FIG. 3d.

With the Probability menu choice displayed, pressing the input button permits the user to choose a probability function (e.g., lower tail standard deviation, inverse lower tail standard deviation, student, inverse student, chi-squared, inverse chi-squared, F-distribution, inverse F-distribution). However, if the user does not desire to perform a probability function, the user can press the down arrow key 24 to cause the next choice to be displayed as illustrated in FIG. 3e.

Figure 3E:
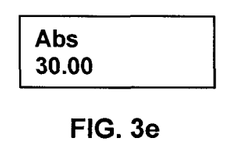

In FIG. 3e, the absolute value math function is shown. On a first line 132 of the display, the title of the math function (ABS) is displayed while on a second line 132, the result of the ABS math function (30.00) on the original input data (30 from FIG. 3a) is displayed. Thus, upon "arrowing down" to the absolute value math function, the calculator 10 concurrently reports to the user the type of math function (ABS in this example) and the result of that particular function. The user need not press any other button on the keyboard to select the absolute value math function to make the calculator perform that function. Instead, the calculator automatically performs the function and displays the result.

Figure 3F:
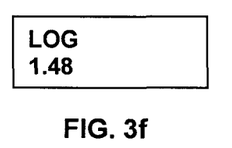

In FIG. 3f, the use has pressed the down arrow key 24 yet again to switch to another math function—logarithm in this case. The calculator 10 concurrently displays the title of the function (LOG) on line 130 and the value on line 132 resulting from the application of the logarithm function to the original input value 30 from FIG. 3a. The computed result is 1.48 as is shown in FIG. 3f. Again, the user need not press any other button on the keyboard to select the logarithm math function to make the calculator perform that function. Instead, the calculator automatically performs the function and displays the result.

If desired, the user can press the up arrow button 22 to cycle through the list of displayed choices (trigonometry, hyperbolic, probability, absolute value, and logarithm) in the opposite order from that described above using the down arrow button 24.

Figure 4:
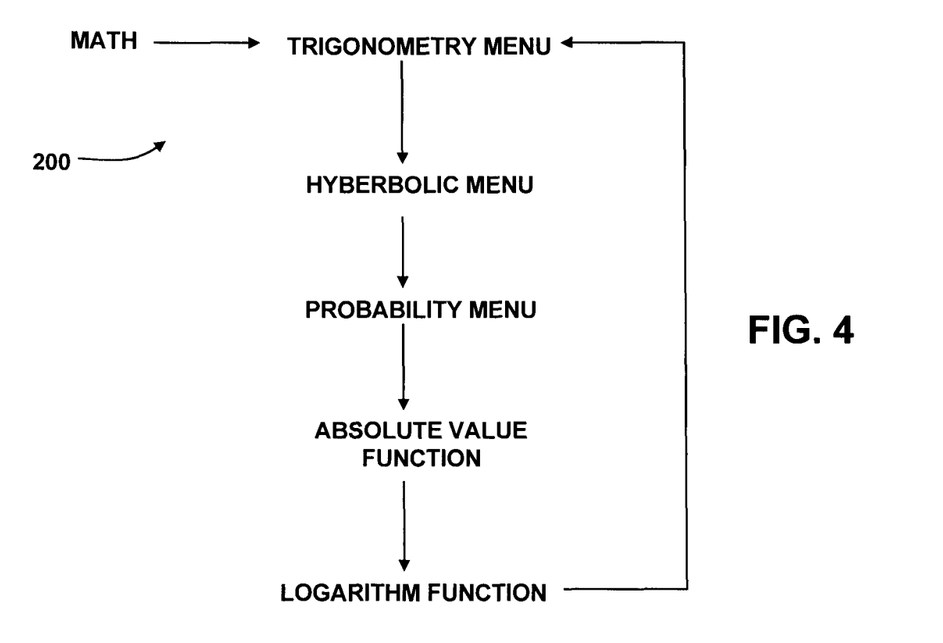
FIG. 4 shows a menu structure associated with the math button in accordance with various embodiments.

FIG. 4 graphically illustrates the menu hierarchy 200 described above. Upon pressing the math button 20 and repeatedly pressing the down arrow button 24, the displayed listing cycles through the trigonometric menu, hyperbolic menu, probability menu, absolute value math function, and logarithm function as shown. The cycle can be any either direction depending on whether the up or down arrow buttons 22 and 24 is used.

Figure 5A:
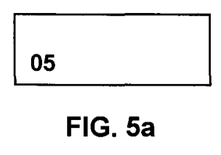
FIGS. 5a-5f illustrate another sequence of events by which a user sequences through a series of math functions associated with the trigonometric menu choice of FIG. 3b in accordance with various embodiments.
Figure 5B:
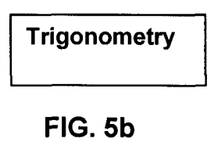
Figure 5C:
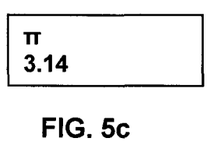
Figure 5D:
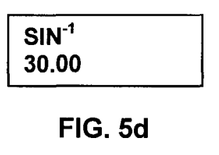
Figure 5E:
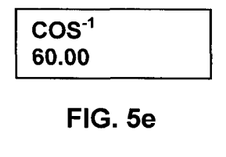
Figure 5F:
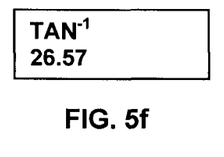

FIGS. 5a-5f illustrate the operation of the calculator 10 when one of the math menu choices is selected by pressing the input button 26. In this example, the trigonometry menu choice is selected. In FIG. 5a, a user enters a data value of 0.5. In FIG. 5b, the user has pressed the shift and math buttons 18 and 20 to display the trigonometric menu choice. At this point, the user presses the input button 26 to be presented one or more choices of trigonometric functions. In 5c, the pi ($\pi$) operator is shown. If the user presses the down arrow button 24, an inverse sine ($\sin^{-1}$) math function is shown (FIG. 5d). Also displayed is the result of the inverse sine math function on the original input data 0.5. That result is 30.00 which is shown in FIG. 5d on a separate line from that of the title of the inverse sine function ($\text{SIN}^{-1}$). As the user presses the down arrow button 24 again and then again, the calculator 10 shows the inverse cosine and then inverse tangent functions on the display 12 (FIGS. 5e and 5f). With each displayed function, the results of the application of those functions are also shown (60.00 for the inverse cosine function and 26.57 for the inverse tangent function).

Figure 6:
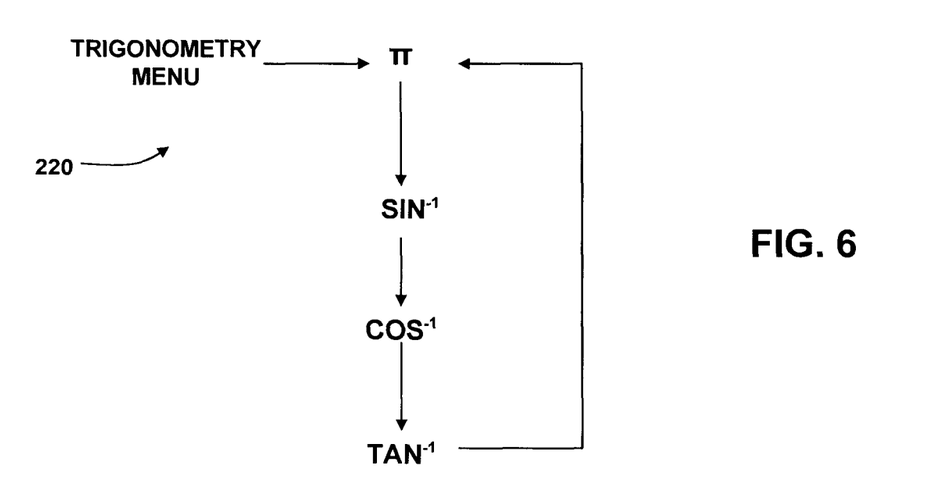
FIG. 6 shows a menu structure associated with the trigonometry menu choice made available via the math button in accordance with various embodiments.

FIG. 6 graphically illustrates the menu hierarchy 220 described above regarding the trigonometry menu. Upon pressing the input button 26 with the trigonometry menu choice displayed, and repeatedly pressing the down arrow button 24, the displayed listing cycles through the various trigonometric functions including the pi operator, inverse sine, inverse cosine function, and inverse tangent function as shown. The cycle can be any either direction depending on whether the up or down arrow buttons 22 and 24 are used.

Figure 7:
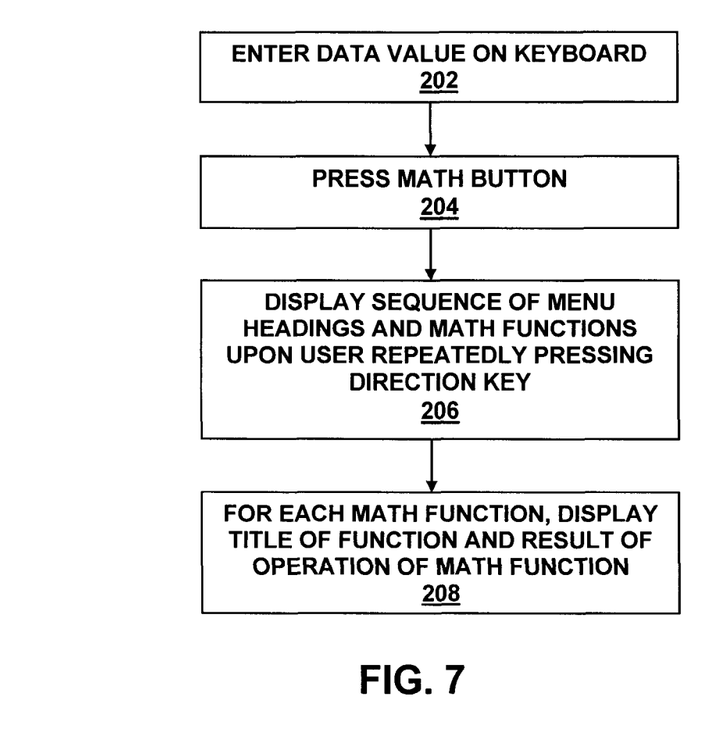
FIG. 7 shows a method in accordance with various embodiments.

FIG. 7 illustrates a method comprising actions 202-208. At 202, a user enters data on the keyboard 14 of calculator 10. At 204, the user presses the math button 20 (preceded preferably by the shift button 18). At 206, the calculator displays a sequence of selectable menu headings and math functions on a display upon a user repeatedly pressing a direction key on the keyboard. At 208, for each such math function, the method comprises displaying a title of the math function and the result of the operation of the math function on the entered data value. The operation result is displayed without a user pressing another key (e.g., without having to press an input button 26 or other type of button).

Figure 8:
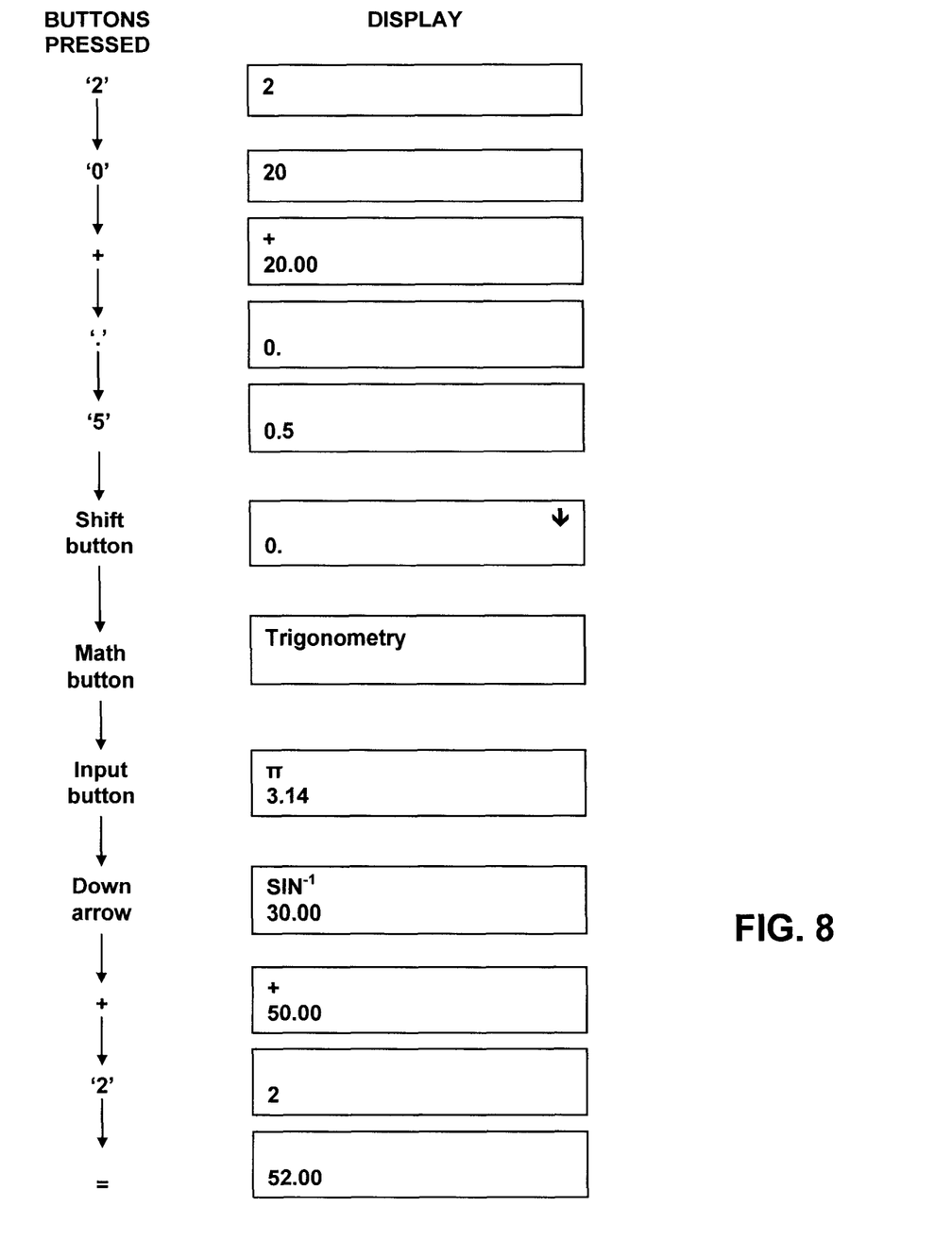
FIG. 8 shows an example of a calculation using the math button and associated user interface in accordance with various embodiments.

FIG. 8 shows an example of a calculation that can be performed on calculator including the use of the math menu button 20 and associated user interface describe above. The calculation shown in FIG. 8 is:

$$20+\sin^{-1}(0.5)+2$$

The buttons that are pressed are depicted down the left-hand column in FIG. 8 and the status of the display 12 with each button pressed is shown in the right-hand column. As shown, the user presses the '2' then '0' buttons to enter the data value '20. Next, the user presses the shift button 18 followed by the math button 20 to select the math menu interface described above. The first menu choice is the trigonometry menu choice as shown. The inverse sine math function falls within the trigonometry math menu and thus the user presses the input button 26. The user down arrows through the pi operator to reach the inverse sine function. Once the inverse sine function is shown (with its result of 30.00 also shown), the user need only continue the calculation by pressing the next operator (the addition operator). The user need press another button to select the inverse sine function. Finally, the user presses the equal sign at 222 to show the result of the calculation (52.00).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor;
a keyboard coupled to the processor, said keyboard comprising a mathematical function key and an arrow key; and
a display coupled to the processor, said display having only two lines with one line used for numbers as well as text and another line used for numbers only;
wherein, when said mathematical function key is pressed, said processor causes said display to display a sequence of at least one math function and at least one math menu choice upon a user repeatedly pressing the arrow key, wherein the at least one math menu choice describes a group of one or more math functions or sub-menu choices and is not itself a math function; and
wherein, for each math function displayed on the display, the processor concurrently also causes the result of the math function to be displayed without the user pressing another key;
wherein the at least one math function and at least one math menu choice are displayed one at a time.

2. The system of claim 1 wherein math menu choices comprise at least one choice selected from a group consisting of trigonometric, hyperbolic and probability menu choices.

3. The system of claim 1 wherein the math functions comprise at least one function selected from a group consisting of absolute value and logarithm.

4. The system of claim 1 wherein the keyboard also comprises an input key and wherein, upon a user pressing the input key when the at least one menu choice is being displayed, the processor causes a subset of math functions to be sequentially displayed upon a user repeatedly pressing the arrow key.

5. The system of claim 1 wherein upon a desired math function being displayed, the user can press a math operator key on the keyboard which causes the processor to accept the desired math function.

6. The system of claim 1 wherein said system is a hand-held calculator.

7. A method, comprising:
entering a data value on a calculator keyboard;
pressing a math button on the calculator keyboard;
displaying one at a time a sequence of at least one selectable menu choice and at least one math function on a display upon a user repeatedly pressing a direction key on the keyboard wherein the at least one math menu choice describes a group of one or more math functions or sub-menu choices and is not itself a math function; and
for each such math function, displaying a title of the math function and the result of the operation of the math function on the entered data value without a user pressing another key.

8. The method of claim 7 wherein upon displaying a selectable menu choice, pressing an input button on the calculator keyboard and then displaying a sequence of math functions on the display upon a user repeatedly pressing a direction key on the keyboard.

9. The method of claim 7 further comprising accepting the result of the operation as part of computation by pressing a math operator button, said math operator button being a button selected from an add, a subtract, a multiply, and a divide button.

10. The method of claim 7 wherein displaying the sequence of the at least one selectable menu choice comprises displaying menu headings selected from a group consisting of trigonometric, hyberbolic and probability menu headings.

11. The method of claim 7 wherein displaying the title of the math function and the result comprises displaying the title on a first line of the display and the result on a different line of the display.

12. A hand-held calculator, comprising:
logic;
a keyboard coupled to the logic, said keyboard comprising a mathematical function key and an arrow key; and
a display coupled to the logic, said display comprising less than two lines on which to display alphanumeric characters;
wherein, upon said mathematical function key being pressed, said logic causes said display to display at least one math menu title and at least one math function upon a user repeatedly pressing the arrow key wherein the at least one math menu choice describes a group of one or more math functions or sub-menu choices and is not itself a math function; and
wherein, for the at least one math function displayed on the display, the logic concurrently also causes the result of the math function to be displayed without the user pressing another key; and
wherein the at least one math function and at least one math menu choice are displayed one at a time.

13. The calculator of claim 12 wherein, upon a user pressing an input key on the keyboard with a math menu title being displayed, the logic causes a subset of math functions to be sequentially displayed upon repeatedly pressing the arrow key.

14. The calculator of claim 12 wherein, for each math function displayed on the display, the logic concurrently causes an alphanumeric designator of math function to be displayed on a line of the display and the result of the math function to be concurrently displayed on a separate line of the display.

* * * * *

UNITED STATES PATENT AND TRADEMARK OFFICE
CERTIFICATE OF CORRECTION

PATENT NO. : 8,464,179 B2
APPLICATION NO. : 12/243806
DATED : June 11, 2013
INVENTOR(S) : de Brebisson Page 1 of 1

It is certified that error appears in the above-identified patent and that said Letters Patent is hereby corrected as shown below:

In the Claims

In column 6, line 17, in Claim 10, delete "hyberbolic" and insert -- hyperbolic --, therefor.

Signed and Sealed this
Twenty-ninth Day of October, 2013

Teresa Stanek Rea
*Deputy Director of the United States Patent and Trademark Office*